(12) United States Patent
Liou et al.

(10) Patent No.: US 6,276,606 B1
(45) Date of Patent: Aug. 21, 2001

(54) FULL RANGE BAR CODE SCANNER

(76) Inventors: Kenneth Liou; Kai-Yuan Tien, both of 9F, No.108-3, Min-Chuan Rd., Hsin-Tien, Taipei Hsien (TW)

( * ) Notice: Subject to any disclaimer, the term of this patent is extended or adjusted under 35 U.S.C. 154(b) by 0 days.

(21) Appl. No.: 09/640,995

(22) Filed: Aug. 18, 2000

(51) Int. Cl.[7] .................................................... G06K 7/10
(52) U.S. Cl. .................. 235/472.01; 235/462.24
(58) Field of Search ........................... 235/462.24, 472.01

(56) References Cited

U.S. PATENT DOCUMENTS 5,744,790 * 4/1998 Li .................................... 235/462.24

* cited by examiner

Primary Examiner—Harold I. Pitts
(74) Attorney, Agent, or Firm—Bacon & Thomas, PLLC

(57) ABSTRACT

The present invention relates to a full range bar code scanner primarily comprising a scanner housing inside of which a light source, a lens set and a CCD-sensing device are mounted. The light source emits light to reflect upon a bar code in front thereof. Thereafter, the created reflection rays are focused after passing through the lens set so that the image of the bar code is formed on the CCD-sensing device and converted into digital data for use after being read by the CCD-sensing device and decoded by an electrical circuit. This improvement is characterized in that a spectroscope is mounted at the path of the reflection rays in front of the lens set. One side of the spectroscope opposite to the lens set is constructed as reflection face with reflection effect. At least one secondary reflector is installed near the spectroscope. By means of the spectroscope and the secondary reflector, the image of the bar code within a short distance reflects upon two lens in order to prolong the false light travel for reaching a focusing of a long distance and the range of the depth of focus. Thus, the image of the bar code is formed on the CCD-sensing device after passing through the lens set. Accordingly, a bar code scanner with a full scanning range for bar codes at a short or long distance is attainable.

3 Claims, 5 Drawing Sheets

FULL RANGE BAR CODE SCANNER

BACKGROUND OF THE INVENTION

1. Field of the Invention

The present invention relates to a full range bar code scanner, more particularly, to a bar code scanner having a wider reading range without the distance restriction in scanning the bar code signals.

2. Description of the Prior Art

A conventional bar code scanner, as shown in FIGS. 1 and 2, contains a scanner housing 1 inside of which a light source 2, a lens set 3 and a CCD-sensing device 4 are disposed. The light source 2 shines on a bar code 5 in front thereof, and the reflection light 6 is focused by the lens set 3 and the image of the bar code 5 is formed on the CCD-sensing device 4. After read by the CCD-sensing device 4 and decoded by an electrical circuit, the image is converted into digital data for use.

As described above, the scanning distance at which a clear image is formable is not the same because of the difference of the curvature of the lens set 3 and the focus design between the lens set 3 and the CCD-sensing device 4. The principle thereof is similar to that of the diopter of the spectacles and the magnifying glass. Being too far will cause a difficult recognition due to the insufficient brightness and the small image. Being too near will cause a difficult forming of image or the image-forming range beyond the capacity of the CCD-sensing device 4. Therefore, the effective distance (depth of focus, symbolized by "X") of the reflection light of the bar code upon the CCD-sensing device 4 is fixed. Accordingly, the reading distance of the conventional bar code scanner is restricted by the lens set 3 in such a way that the image of the bar code beyond the standard reading range can't be formed on the CCD-sensing device 4. As a result, the conventional scanner designated for reading a remote bar code is not suitable for reading a bar code within a short distance. In the contrary, the scanner for reading a bar code within a short distance isn't suited for reading a remote bar code. In addition, the depth of focus "X" of the common scanners for recognizing the bar code is not enough, causing the inconvenience in using that the user has to repeatedly adjust the distance between the scanner and the bar code.

SUMMARY OF THE INVENTION

It is therefore a primary object of the present invention to provide a full range bar code scanner which overcomes the restriction of the depth of focus of the conventional scanner and extends the range of the scanner in recognizing the bar code with a most simple and effective structure to facilitate a rapid reading of the bar code.

In order to reach the above-mentioned object, the full range bar code scanner in accordance with the present invention primarily comprising a scanner housing inside of which a light source, a lens set and a CCD-sensing device are mounted. The light source emits light to reflect upon a bar code in front thereof. Thereafter, the created reflection rays are focused after passing through the lens set so that the image of the bar code is formed on the CCD-sensing device and converted into digital data for use after being read by the CCD-sensing device and decoded by an electrical circuit. This improvement is characterized in that a spectroscope (through which some of rays pass and on which some of them reflect) is mounted at the path of the reflection rays in front of the lens set. One side of the spectroscope opposite to the lens set is constructed as reflection face with reflection effect, and at least one secondary reflector is installed near the spectroscope. By means of the spectroscope and the secondary reflector, the image of the object or the bar code within a short distance (beyond the depth of the lens focus) reflects upon two lens in order to prolong a false light travel for reaching a focusing of a long distance and the range of the depth of focus. Thus, the image of the bar code is formed on the CCD-sensing device 4 after passing through the lens set. Accordingly, a bar code scanner with a full scanning range of a short and long distance is attainable.

The spectroscope is filmed in such a way that only about 90% of rays can pass through the spectroscope. Moreover, at least 90% of rays are able to be reflected by the reflection face.

Accordingly, the focus (light-focusing travel) is fixed so that the scanner in accordance with the present invention is able to read the bar code at a great distance within the depth of focus by means that the original reflection rays of the bar code directly pass through the spectroscope. The reflection rays of the bar code (at a short distance) beyond the range of the original depth of focus reflect upon the secondary reflector and the spectroscope first to prolong the projection distance. Consequently, the scanner is mated to the position of the less depth of focus to form a clear image on the CCD-sensing device so that the effect and the aims of bar code scanner with a full scanning range for the bar code at a short and long distance is attainable.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DETAILED DESCRIPTION OF THE PREFERRED EMBODIMENT

Figure 1:
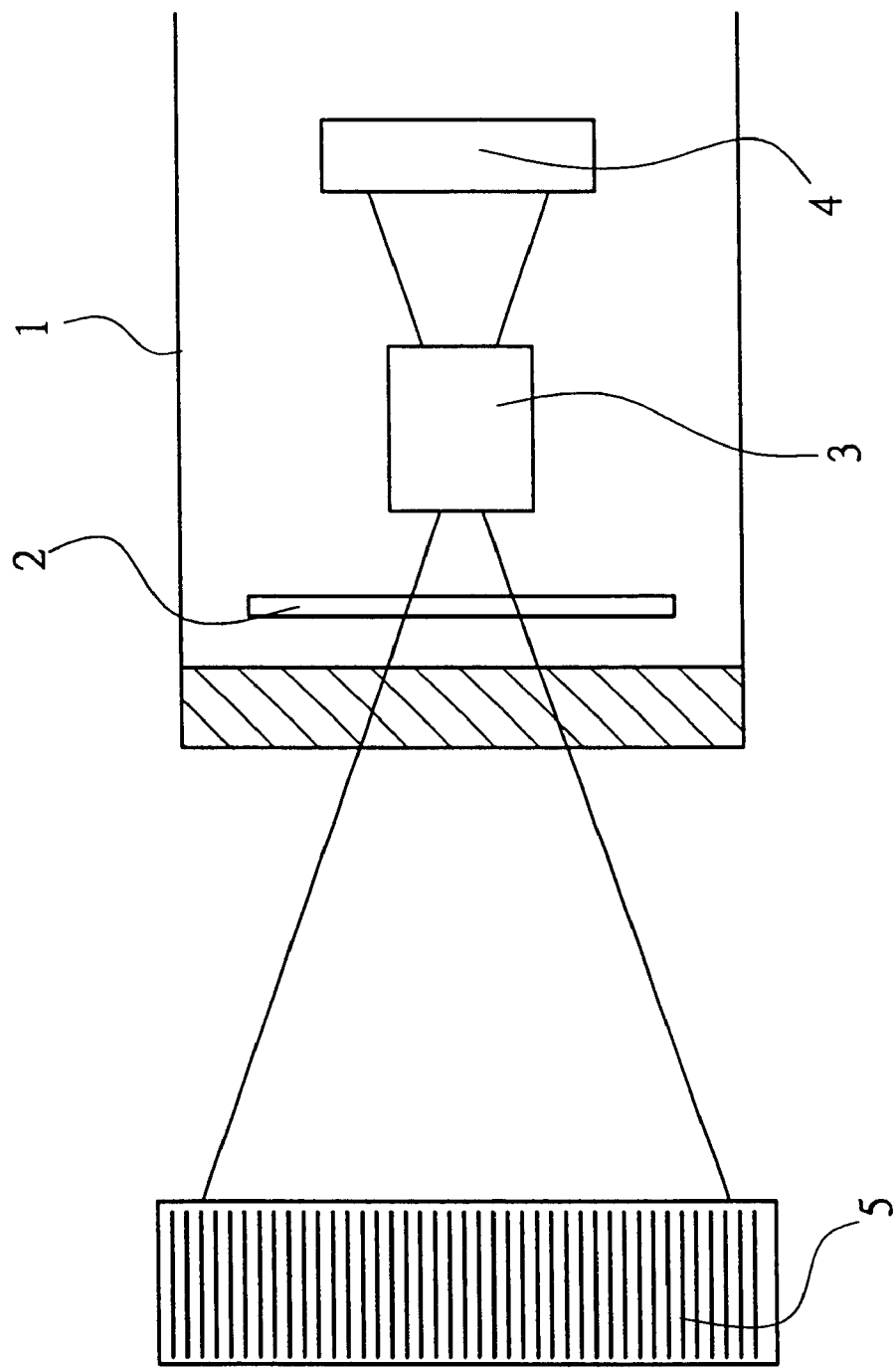
FIG. 1 is a top view of a conventional scanner.
Figure 2:
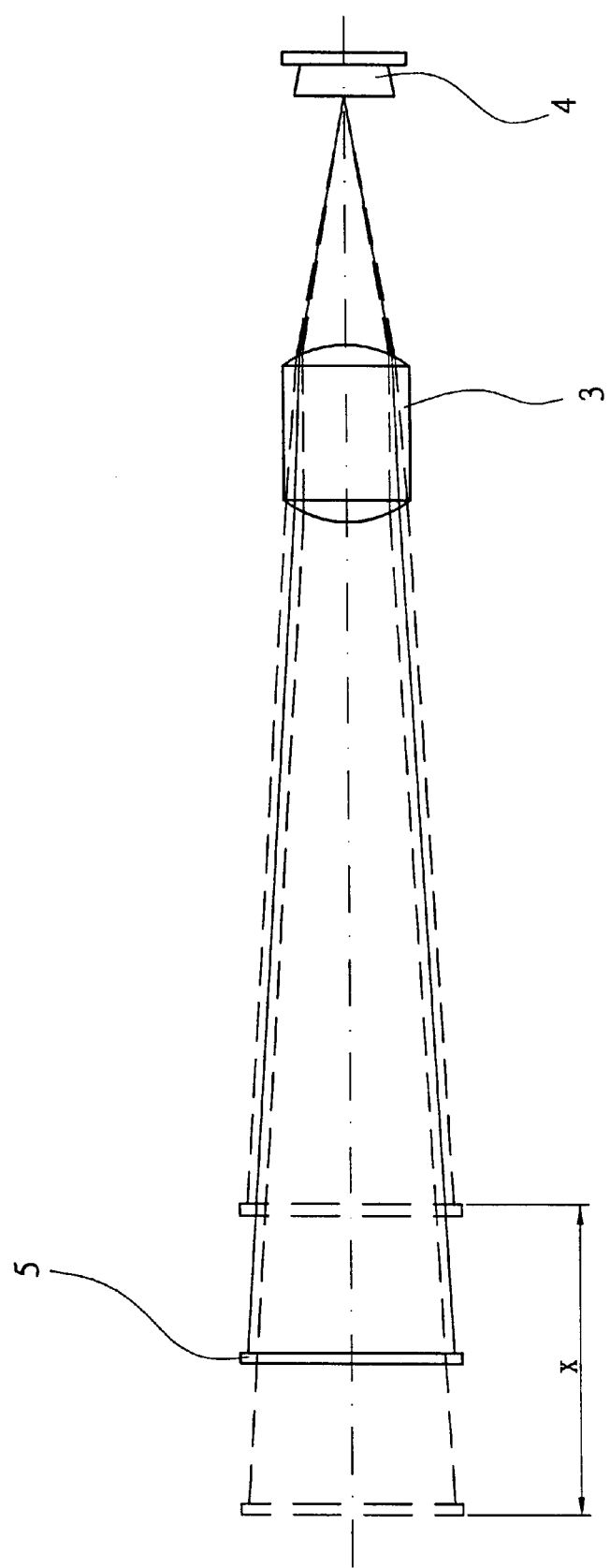
FIG. 2 is an optical drawing of the scanner.
Figure 3:
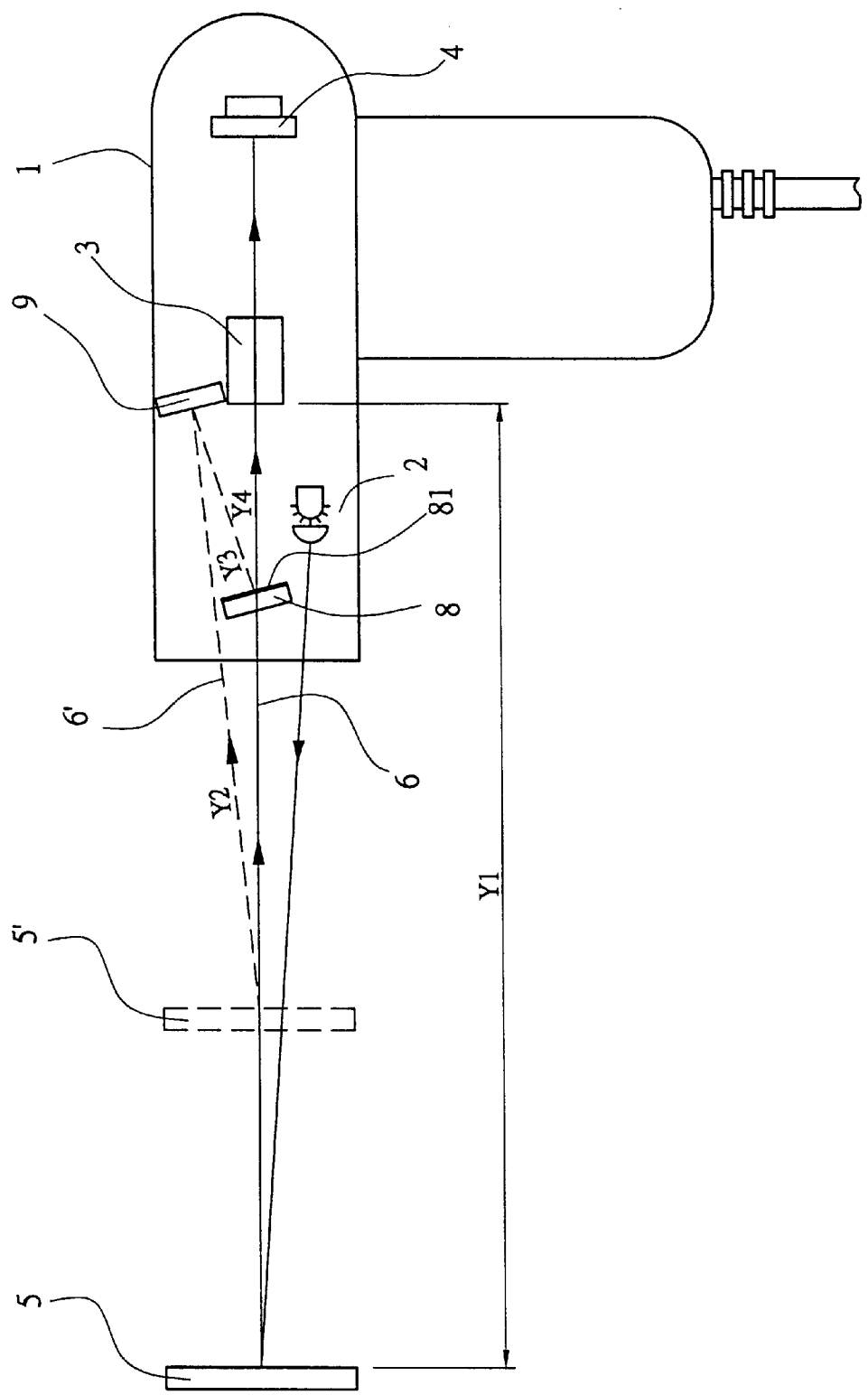
FIG. 3 is a side view of an embodiment of the present invention.

First of all, referring to FIG. 3, a full range bar code scanner in accordance with the present invention primarily includes a scanner housing 1 inside of which a light source 2, a lens set 3 and a CCD-sensing device 4 are mounted. The light source 2 emits light with LED-lamp 21 whereupon the light passes through a light post 22 to reflect upon a bar code 5 in front thereof while the created reflection rays 6 are focused after passing through the lens set 3. Therefore, the image will be formed on the CCD-sensing device 4. After read by the CCD-sensing device 4 and decoded by an electrical circuit, the image is converted into digital data for use.

Figure 4:
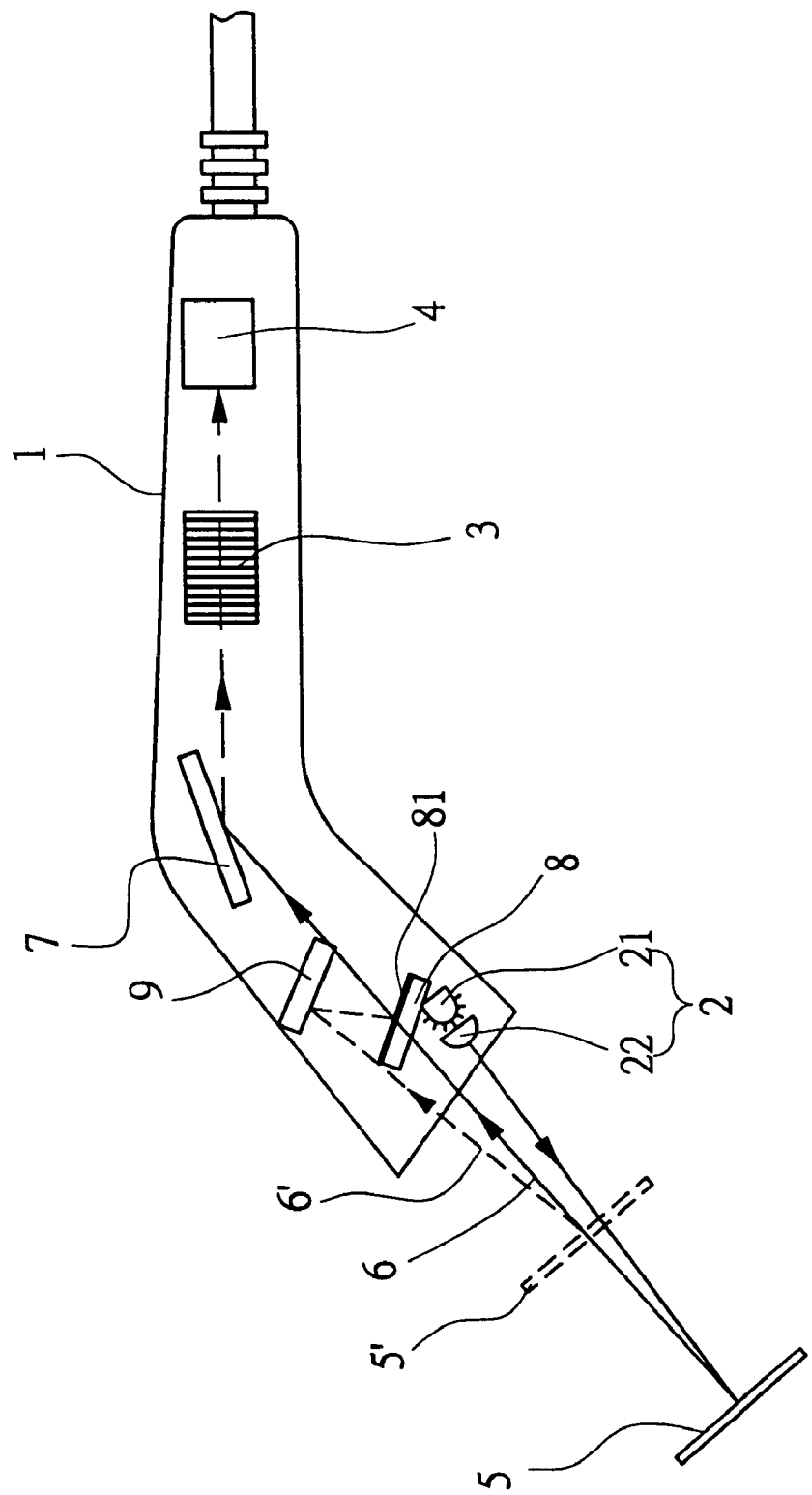
FIG. 4 is a side view of another embodiment of the present invention.

Referring to FIG. 4, a reflector 7 is interposed between the bar code 5 and the lens set 3 to change the path of the reflection rays 6. This will reach the same scanning effect as well.

Referring to FIGS. 3 and 4, a spectroscope 8 is mounted at the path of the reflection rays 6 in front of the lens set 3. One side of the spectroscope 8 opposite to the lens set 3 is constructed as reflection face 81 with reflection effect.

Besides, a secondary reflector 9 is installed near the spectroscope 8. In combination with the reflection face 81 of the spectroscope 8, the secondary reflector 9 can receive the reflection rays 6' of the bar code beyond the range of the original depth of focus (supposed that the bar code is situated at the position of 5'). Thereafter, the reflection rays 6' reflect themselves upon the reflection face 81 of the spectroscope 8 in such a way that the reflected rays and the original reflection rays 6 are overlapped in position. Then, the image will be formed on the CCD-sensing device 4 after the reflection rays pass through the lens set 3.

The spectroscope 8 is filmed in such a way that only about 90% of rays can pass through the spectroscope 8. Moreover, at least 90% of rays are able to be reflected by the reflection face 81.

Figure 5:
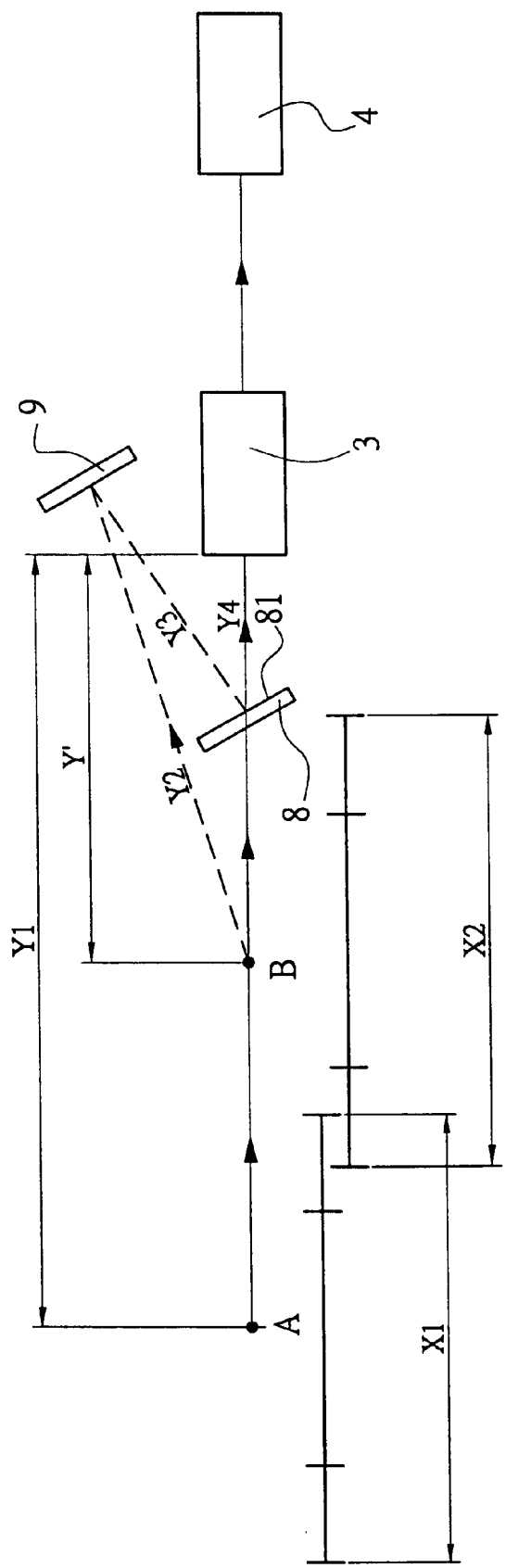
FIG. 5 is a schematic drawing of the multiple depth of focus of the present invention.

Again, referring to FIGS. 3 and 5, the present invention can read the bar code at a farther distance within the depth of focus "X1". The scanning distance of the best observation point A (original focus, the position of the best resolution) is marked by Y1. Supposed that the distance of Y1 is the best scanning distance, the scanning distance of the straight line at the observation point B is beyond the readable range. As described above, the secondary reflector 9 in accordance with the present invention receives the reflection rays 6' of the bar code beyond the range of the original depth of focus "X1". Thereafter, the reflection rays 6' will be reflected by the reflection face 81 of the spectroscope 8 to enable the distance of another observation point B in front of the lens set 3 to be converted from y' to Y=Y2+Y3+Y4. If Y=Y1, a best observation point B and the depth of focus "X2" will be created, as shown in FIG. 5. Consequently, the scanner is mated to the position of the less depth of focus to form a clear image on the CCD-sensing device 4. Moreover, the scanning range of the original depth of focus "X1" is enlarged to be "X1+X2". Accordingly, the effect and the aims of bar code scanner with a full scanning range for bar codes at a short or long distance is attainable.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A full range bar code scanner primarily comprising a scanner housing having a light source, a lens set and a CCD-sensing device mounted inside thereof, said light source emitting light to reflect upon a bar code in front thereof, created reflection rays being focused after passing through said lens set so that the image of said bar code is formed on said CCD-sensing device and converted into digital data for use after being read by said CCD-sensing device and decoded by an electrical circuit, characterized in that a spectroscope is mounted at the path of said reflection rays in front of said lens set, and that one side of said spectroscope opposite to said lens set is constructed as reflection face with reflection effect, and that at least one secondary reflector is installed near said spectroscope, and that said secondary reflector is able to receive said reflection rays of said bar code beyond the range of the original depth of focus; thereafter, said reflection rays reflect themselves upon said reflection face of said spectroscope so that said image will be formed on said CCD-sensing device after said reflection rays pass through said lens set.

2. A full range bar code scanner as claimed in claim 1, wherein said spectroscope is filmed in such a way that only about 90% of rays can pass through said spectroscope, and that at least 90% of rays are able to be reflected by said reflection face.

3. A full range bar code scanner as claimed in claim 1, wherein a plurality of said secondary reflectors are utilized in combination with said spectroscope for repeated reflection to obtain an extended depth of focus.

\* \* \* \* \*